United States Patent Office 2,785,160
Patented Mar. 12, 1957

2,785,160
DERIVATIVES OF PHENTHIAZINE

Robert Michel Jacob, Ablon-sur-Seine, and Jacques Georges Robert, Paris, France, assignors to Societe des Usines Chimiques Rhone-Poulenc, Paris, France, a French body corporate No Drawing. Application May 29, 1952,
Serial No. 290,835

Claims priority, application France July 24, 1951

5 Claims. (Cl. 260—243)

This invention relates to new phenthiazine derivatives having valuable therapeutic properties and to processes for producing these new compounds.

The present applicants were responsible for the discovery that compounds of the general formula:

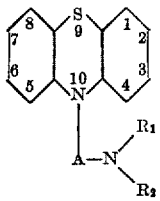

(where A represents a straight or branched alkylene chain and $R_1$ and $R_2$ represent hydrogen atoms or alkyl groups or together with the adjacent nitrogen atom represent the residue of a heterocyclic ring which may contain a further hetero atom) possess antihistaminic and ganglion-blocking properties. Of the compounds in this class, they described two compounds in which the phenthiazine ring was substituted not only by the diamino- or dialkylamino-alkyl group in the 10-position but also by a methoxy group in position meta to the sulphur atom (that is to say in the 2-position according to the nomenclature adopted by Beilstein although in, for example, the Patterson system such meta position is known not as the 2- but as the 3-position).

It has now been unexpectedly discovered that certain hitherto unknown members of the aforesaid class of N-diamino (or dialkylamino)-alkyl phenthiazines possess specific advantage as potentiators of general and local anaesthetics and of analgesics and which are, therefore, of value in human and veterinary medicine. In this respect, they have been shown to compare favourably with the known members of the same class as will be illustrated hereinafter. By the term "potentiator" is meant a material which increases the duration of effect of the active substance.

The new compounds of the present invention are compounds of the foregoing general formula in which the phenthiazine ring contains in the 1- or the 3-position (Beilstein nomenclature as indicated in the foregoing general formula) a lower alkyl (preferably methyl) group or a lower alkoxy (preferably methoxy) group and in which the grouping

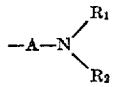

represents a dimethylaminopropyl or a pyrrolidinopropyl chain in which preferably the propyl radical is the n-propyl radical. By the term "lower alkyl" or "lower alkoxy" is meant a group of the type specified containing not more than 4 to 6 carbon atoms.

The compounds of the present invention may be prepared from a meta-lower alkyl (or lower alkoxy) substituted diphenylamine by known methods for the conversion of a diphenylamine into an N-tertiary-amino alkylphenthiazine. By the expression "known methods" is meant any method heretofore employed or described in the chemical literature. Whatever method be adopted, one stage involves cyclisation of the diphenylamine by heating with sulphur and this cyclisation step leads to a mixture of isomeric phenthiazines in which the lower alkyl or lower alkoxy substituent is in the 1- or 3-position respectively. Such isomers may be separated by known methods such as fractional crystallisation but, since the 1- and the 3-substituted phenthiazine derivatives of the present invention are therapeutically effective in the presence of each other, such separation of isomers is not essential and when not effected leads, of course, to a final product in the form of a mixture.

The relative efficacy of the compounds of the invention as potentiators of, for example, general anaesthethics is illustrated by the following tests:

Mice were injected by the intravenous route, with 50 mg./kg. of hexobarbital. In mice which had undergone no other treatment, this injection induced narcosis of an average duration of from 5 to 10 minutes; in mice which had received in addition a sub-cutaneous injection of 20 mg./kg. of 10-(3'-dimethylamino-1'-propyl)-phenthiazine, the average duration of narcosis was 60 minutes; when the second injection was replaced by the same dose of 10-(3'-dimethylamino-1'-propyl)-1(or 3)-methyl-phenthiazine, the average duration of narcosis was 132 minutes; and analogous result was obtained with 1(or 3)-methoxy derivative.

The influence of the position of the substituent in the phenthiazine nucleus is shown by means of the same test applied for comparison to a product already described, 10 - (2' - dimethylamino - 1' - propyl) - 2 - methoxy - phenthiazine, and to its isomer in which the methoxy group is in the position 1 (or 3): the average duration of narcosis was 38 minutes for the known product and 63 minutes for the new product.

One preferred process for preparing the compounds of the present invention consists in condensing a phenthiazine suitably substituted in position 1- or 3-with a tertiary-aminoalkyl halide, in the form of a dimethyl-aminopropyl halide or of a pyrrolidinopropyl halide.

The reaction is conveniently carried out in the presence of an acid-binding agent, being preferably a member of the class consisting of alkali metals and their derivatives, e. g. hydroxides, hydrides, amides, alcoholates and metal-alkyl or metal-aryl compounds. The preferred acid-binding agents are sodamide, metallic sodium, powdered sodium and potassium hydroxides, lithium hydride, sodium tertiary butylate, butyl lithium and phenyl lithium.

The reaction is also preferably carried out in an organic non-ionic diluent which is a solvent for at least one of the two reactants at or in the neighbourhood of the boiling point of the solvent. It is particularly advantageous to use the tertiary aminoalkyl halide in the form of the free base in solution in an organic solvent, for example, benzene, toluene or xylene, and to add the solution to a heated (preferably boiling) mixture of the phenthiazine compound, an acid-binding agent and said organic solvent. The reaction can also be carried out without acid-binding agent by introducing the solution of tertiary aminoalkyl halide, a little at a time, into the molten phenthiazine compound. When following either of these two procedures, it is necessary in order to avoid loss of organic diluent that the reaction vessel be an autoclave or be fitted with a reflux condenser.

The tertiary aminoalkyl halide can be employed in the form of an acid addition salt but, in this case, it is obviously necessary to add a greater proportion of acid-binding agent in order to neutralise the acid liberated from the acid salt.

The compounds of the present invention can also be prepared, for example, by reacting dimethylamine or pyrrolidine with an N- halogenopropyl-phenthiazine suitably substituted in position 1- or 3-.

As will be appreciated from the foregoing the phenthiazine starting materials employed in the two specific processes hereinbefore described are prepared by the cyclisation of diphenylamine (appropriately substituted in the 1- or 3-position) by heating with sulphur, with or without subsequent separation of the isomeric products thereby formed.

The following non-limitative examples show how the invention may be put into practice. To simplify matters, the position of the alkyl or alkoxy substituents in the phenthiazine nucleus has not been indicated; it is understood that they are in position 1 (or 3) as hereinbefore defined. The temperatures indicated are on the centigrade scale.

Example I 10.6 g. of 3-methyl-phenthiazine (M. P.=187–188°; obtained by condensing sulphur with 3-methyl-diphenylamine), 40 g. of xylene and 2.53 g. of 90% sodamide are mixed. Then 8 g. of 3-dimethylamino-1-chloropropane, diluted by its own weight of xylene, is gradually added over 1 hour, while maintaining the mixture at boiling point. Heating under reflux is continued for another hour. After cooling, the mixture is taken up in 150 cc. of water and slightly acidified by hydrochloric acid. The xylene is decanted, and the aqueous layer made strongly alkaline by the addition of caustic soda. The base is extracted with ether and distilled. 11.6 g. of 10-(3'-dimethylamino-1'-propyl)-3-methyl-phenthiazine, (B. P.$_{0.1}$=186–188°) is obtained; hydrochloride M. P.=194°.

Example II

Working in the same manner, starting with 11.5 g. of methoxy-phenthiazine (M. P.=179–180°; prepared by condensing sulphur with 3-methoxy-diphenylamine), 7.3 g. of 3-dimethylamino-1-chloropropane dissolved in xylene, and 2.8 g. of 90% sodamide, 9 g. of 10-(3'-dimethylamino - 1' - propyl) - methoxy - phenthiazine (B. P.$_{0.15}$=211°) is obtained; oxalate M. P. =178–179°, iodomethylate M. P.=70°.

Example III

Starting with 15.9 g. of 3-methyl-phenthiazine, 13.8 g. of 3-pyrrolidino-1-chloropropane dissolved in xylene and 4.2 g. of 80% sodamide, 14.9 g. of 10 - (3' - pyrrolidino-1'-propyl)-3-methyl-phenthiazine (B. P.$_{0.15}$=207–212°), is obtained; oxalate M. P.=175°.

Example IV

Starting with 10 g. of methoxy-phenthiazine, 7.9. g. of 3-pyrrolidino-1-chloropropane dissolved in xylene, and 2.45 g. of 80% sodamide, 9 g. of 10-(3'-pyrrolidino-1'-propyl)-methoxy-phenthiazine (B. P.$_{0.1}$=205–207°), is obtained; hydrochloride M. P.=143–145°.

Example V

Starting with 11.5 g. of methoxy-phenthiazine, 7.3 g. of 1-dimethylamino-2-chloropropane dissolved in xylene, and 2.3 g. of 80% sodamide, 10.8 g. of 10-(2'-dimethylamino-1'-propyl)-methoxy-phenthiazine (B. P.$_{0.1}$=198–202°), is obtained; hydrochloride M. P.=170–195°.

Example VI

Starting with 8.75 g. of ethoxy-phenthiazine (M. P.= 131–132°; prepared by condensing sulphur with 3-ethoxy-diphenylamine), 5.1 g. of 3-dimethylamino-1-chloropropane dissolved in xylene, and 1.95 g. of 80% sodamide, 6.25 g. of 10-(3'-dimethylamino-1'-propyl)-ethoxy-phenthiazine (B. P.$_{0.15}$=212–216°), is obtained; oxalate M. P.=157–158°.

Example VII

Starting with 9 g. of butoxy-phenthiazine (M. P.= 119–121°; prepared by condensing sulphur with 3-butoxy-diphenylamine), 4.86 g. of 3-dimethylamino-1-chloropropane dissolved in xylene and 1.75 g. of 90% sodamide, 6.7 g. of 10-(3'-dimethylamino-1'-propyl)-butoxy-phenthiazine (B. P.$_{0.15}$=202–205°) is obtained oxalate M. P.=154°.

The present invention includes within its scope the acid addition salts of the new phenthiazine compounds which, in point of fact, are conveniently used in the form of such salts as the hydrochloride. Of the new phenthiazine compounds described in the foregoing examples, the most important are the products of Examples I and II namely 10-(3'-dimethylamino-1'-propyl)-3-methyl-phenthiazine and 10 - (3' - dimethylamino - 1' - propyl) - methoxy-phenthiazine and their salts.

We claim:

1. A phenthiazine derivative selected from the group consisting of compounds containing the structure:

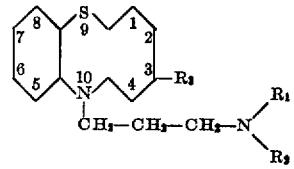

wherein R$_3$ is a group selected from the class consisting of lower alkyl and lower alkoxy groups and in which the grouping

represents a member of the class consisting of the dimethylamino group and the pyrrolidino group and acid addition salts thereof.

2. A phenthiazine derivative consisting of 10-(3'-dimethylamino-1'-propyl)-3-methyl-phenthiazine of the formula:

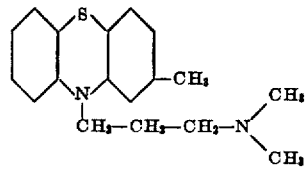

3. A phenthiazine derivative consisting of 10-(3'-dimethylamino-1'-propyl)-3-methoxy-phenthiazine of the formula:

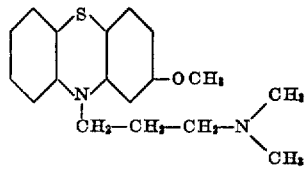

4. A phenthiazine derivative consisting of 10-(3'-pyrrolidino-1'-propyl)-3-methyl-phenthiazine of the formula:

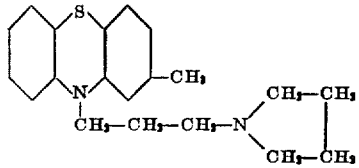

5. A phenthiazine derivative consisting of 10-(3'-pyrrolidino-1'-propyl)-3-methoxy-phenthiazine of the formula:
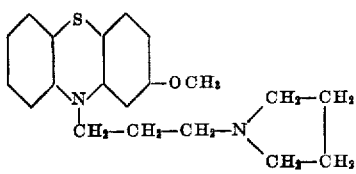
References Cited in the file of this patent
UNITED STATES PATENTS
| 2,480,355 | Charpentier | Aug. 30, 1949 |
| 2,519,886 | Charpentier | Aug. 22, 1950 |
| 2,530,451 | Charpentier | Nov. 21, 1950 |
| 2,534,237 | Cusic | Dec. 19, 1950 |
| 2,607,773 | Berg et al. | Aug. 19, 1952 |
FOREIGN PATENTS
| 134,622 | Sweden | Nov. 22, 1951 |
OTHER REFERENCES
Idson: "Chem. Reviews" December 1950, vol. 47, pp. 491–5.

UNITED STATES PATENT OFFICE
Certificate of Correction

Patent No. 2,785,160                           March 12, 1957

Robert Michel Jacob et al.

It is hereby certified that error appears in the printed specification of the above numbered patent requiring correction and that the said Letters Patent should read as corrected below.

Column 4, lines 25 to 31, the formula should appear as shown below instead of as in the patent—

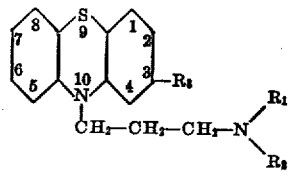

Signed and sealed this 13th day of August 1957.

[SEAL]

Attest:
KARL H. AXLINE,
*Attesting Officer.*

ROBERT C. WATSON,
*Commissioner of Patents.*